US006123889A

United States Patent [19]

Katagiri et al.

[11] Patent Number: 6,123,889

[45] Date of Patent: Sep. 26, 2000

[54] MULTI-LAYER MOLDING METHOD

[75] Inventors: Katuhiro Katagiri, Kakamigahara; Akiyoshi Nagano, Ama-gun, both of Japan

[73] Assignee: Toyoda Gosei Co., Ltd., Aichi, Japan

[21] Appl. No.: 09/084,242

[22] Filed: May 26, 1998

[30] Foreign Application Priority Data

May 26, 1997 [JP] Japan .................................... 9-152855

[51] Int. Cl.[7] .................................................... B29C 45/16

[52] U.S. Cl. .................. 264/255; 264/328.7; 264/328.8; 264/266; 425/112; 425/130

[58] Field of Search ................................ 264/255, 328.8, 264/266, 328.7; 425/112, 130

[56] References Cited

U.S. PATENT DOCUMENTS

| | | | |
|---|---|---|---|
| 4,335,068 | 6/1982 | Hemery | 264/245 |
| 4,385,025 | 5/1983 | Salerno et al. | 264/255 |
| 5,045,268 | 9/1991 | Sorensen | 264/246 |
| 5,094,602 | 3/1992 | Morita | 425/130 |
| 5,618,485 | 4/1997 | Gajewski | 264/255 |

FOREIGN PATENT DOCUMENTS 3-169609 7/1991 Japan .

*Primary Examiner*—Jill L. Heitbrink
*Assistant Examiner*—Suzanne E. McDowell
*Attorney, Agent, or Firm*—Pillsbury Madison & Sutro Intellectual Property Group

[57] ABSTRACT

There is provided a multi-layer molding method by which a molding product of multi-layers, in which a second layer is locally formed on a base layer, is produced, and the multi-layer molding method comprises the steps of: forming locally a cavity for forming the second layer between the first mold and the second mold; injecting a second resin into the cavity for forming the second layer so as to mold the second layer; separating relatively the first mold and the second mold from each other so as to form a cavity for molding a base layer continuously between the first and the second molds and also between the second layer and a mold surface opposing to the second layer; and injecting resin for the base layer into the cavity for molding the base layer.

9 Claims, 7 Drawing Sheets

1
210
11
13
12
15
16
1
1
21
2
23
22

MULTI-LAYER MOLDING METHOD

BACKGROUND OF THE INVENTION

1. Field of the Invention

The present invention relates to a multi-layer molding method by which the mold apparatus can be made compact.

2. Description of the Related Art

In the field of resin moldings, there is provided a resin molding product in which a second layer, the resin material of which is different from that of a base layer, is locally formed on the base layer. In general, this type molding product is produced by the multi-layer molding method and referred to as a multi-layer molding product.

Conventionally, in the above multi-layer molding method, there is used a mold apparatus 9 including two core molds 91, 92, a mold 93 for the base layer and a mold 94 for the second layer as shown in FIG. 13. Molding is conducted with this mold apparatus as follows. For example, this type mold apparatus is disclosed in Japanese Patent Publication No. Sho. 59-199227.

First, the base layer 81 is molded by one core mold 91 and the mold 93 for the base layer. Next, the core mold 91 is turned downward in a direction of an arrow E as shown in FIG. 13, and the second layer 82 is locally molded on the base layer 81 by the core mold 91 and the mold 94 for the second layer.

In the process of molding described above, molding of the base layer 81, which is conducted by one core mold 91 and the mold 93 for the base layer, and molding of the second layer 82, which is conducted by the other core mold 92 and the mold 94 for the second layer, are simultaneously executed. The core molds 91, 92 are turned and used successively for the molding as described above. In this connection, reference numeral 96 shown in the drawing is a plunger used for the injection of resin.

However, in the above conventional multi-layer molding method, it is necessary to provide four molds in total including the two core molds 91, 92, the mold 93 for the base layer, which is opposed to the core mold, and the mold 94 for the second layer, wherein the mold 93 for the base layer and the mold 94 for the second layer are respectively opposed to the two core molds 91, 92. Also, it is necessary to provide a space and a drive unit for turning the core molds 91, 92.

Therefore, the size of the apparatus is increased, and further it becomes necessary to provide a large space for turning the molds. Accordingly, the productivity is low and the equipment cost is high.

SUMMARY OF THE INVENTION

The present invention has been accomplished in view of the above conventional problems. It is an object of the present invention to provide a multi-layer molding method in which the mold apparatus is made compact, the productivity is high and the equipment cost is low.

According to a first aspect of the present invention, there is provided a multi-layer molding method comprising the steps of: forming locally a cavity for molding a second layer between first and second molds; injecting a second resin into the cavity for molding the second layer so as to mold the second layer; separating relatively the first and the second molds from each other so as to form a cavity for molding a first layer continuously between a mold surface of the second mold in which the second layer is not formed and a mold surface of the first mold, and also between the second layer and the mold surface of the first mold opposing to the second layer; and injecting a first resin for the first layer into the cavity for molding the first layer so as to produce a molding product of multi-layer in which the second layer is locally formed on the first layer, and the first and second layers are fused integrally with each other.

The most remarkable point of the present invention is described below. Using a pair of the first and the second molds, the cavity for the second layer is formed between both molds, and the second layer is molded by injecting the second resin into the cavity. Next, both molds are relatively moved in the opposite direction, so that the cavity for the base layer is formed between both molds and also between the mold surface, which is opposed to the second layer, and the second layer, and the base layer is molded by injecting the base layer resin into the cavity for the base layer.

In this case, the mold surface, which is opposed to the second layer, is defined as a mold surface of the first or the second mold which is opposed to the second layer. That is, when the second layer made of the second resin is attached onto the mold surface of the first mold in the case of formation of the cavity for the base layer, the cavity for the base layer is formed between the second layer and the mold surface of the second mold. In the contrary case, the cavity for the base layer is formed between the second layer and the mold surface of the first mold.

Next, the operational effect of the present invention will be explained as follows.

In the present invention, first, the second layer is 15 molded by the cavity for the second layer, and then the base layer is molded by the cavity for the base layer. Due to the foregoing, the second layer is locally molded in a portion on the base layer, and a multi-layer molding product can be provided in which the base layer and the second layer are integrally fused with each other.

The cavity for the base layer used for molding the base layer is formed when the first and the second mold, by which the second layer was molded, are used and both are moved so that they can be separated from each other. Therefore, unlike the conventional example, it is unnecessary to provide four molds, and it is sufficient to use two molds.

The first and the second molds may be relatively moved in the opposite direction to each other by a distance necessary for the formation of the cavity of the base layer, for example, the first and the second mold may be relatively moved in the opposite direction to each other by 1 to 5 mm. Therefore, unlike the conventional example, it is unnecessary to turn the molds. Accordingly, it is unnecessary to provide the drive unit to turn the mold described before.

In the present invention, the molds can be relatively moved for the formation of the cavity of the base layer by a drive unit which is required when the multi-layer molding product is finally picked up after the first and the second molds have been opened and also required when the molds are fastened. For the above reasons, the structure of the drive unit can be simplified.

As described above, according to the present invention, it is possible to provide a multi-layer molding method in which the mold apparatus can be made compact, the productivity is high and the equipment cost is low.

According to a method in view of a second aspect of the present invention, first, the base layer is molded, and then the second layer is molded on the base layer.

That is, according to the second aspect of the invention, there is provided a multi-layer molding method comprising the steps of: preparing first and second molds, the second mold having a protrusion for dividing a cavity for molding a second layer from a space in which the second layer is not molded; forming a cavity for .molding a first layer continuously between the first and the second molds; injecting a first resin for the first layer into the cavity for the first layer so as to mold the first layer; separating relatively the first and second molds from each other so as to make the protrusion come into contact with the first layer so that a second resin for the second layer can not flow into the space in which the second layer is not molded, thereby forming locally the cavity for molding the second layer in a space enclosed by the first layer, a mold surface of the second mold opposing to the first layer and the protrusion; and injecting the second resin into the cavity for the second layer so as to produce a molding product of multi-layer in which the second layer is locally formed on the first layer, and the first and the second layers are fused integrally with each other.

The most remarkable point in the second aspect of the present invention is described as follows. In the same manner as that of the first aspect of the invention, the cavity for the base layer and the cavity for the second layer are formed by the first and the second molds; first, the base layer is molded and then the second layer is molded; and when the second layer is molded, the protrusion for division is made to come into contact with the base layer so that the second resin can not flow out into a space in which no second layer is formed.

Next, the operational effect according to the second aspect of the present invention will be explained below.

In the present invention, first, the base layer is molded by the cavity for the base layer, and then the second layer is molded by the cavity for the second layer. Due to the foregoing, the second layer is locally molded in a portion on the base layer, and a multi-layer molding product can be provided in which the base layer and the second layer are integrally fused with each other.

The cavity for the second layer used for molding the second layer is formed when the first and the second mold, by which the base layer was molded, are used and both are moved so as to be separated from each other and the protrusion for division is made to come into contact with the base layer as described before.

According to the second aspect of the present invention, the same effect as that of the first aspect of the invention can be provided.

DETAILED DESCRIPTION OF THE PREFERRED EMBODIMENTS

1st Embodiment

Referring to FIGS. 1 to 5, the multi-layer molding method according to a first embodiment of the invention will be explained as follows.

Figure 5:
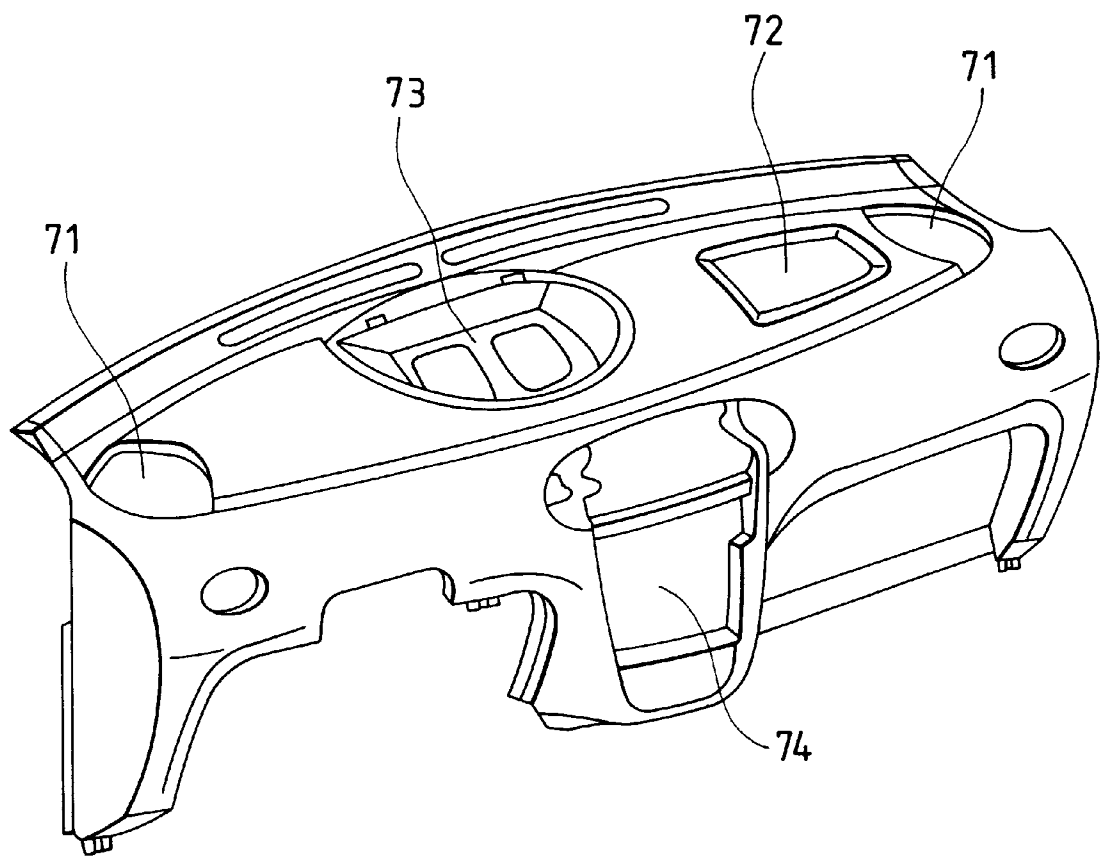
FIG. 5 is a perspective view of the multi-layer molding product obtained according to the first embodiment.

The multi-layer molding product to be obtained by this embodiment is an instrument panel, which is shown in FIG. 5, attached to the front portion of a driver's cabin of an automobile. This instrument panel includes: side air outlets 71, a meter attaching opening 72, a central air outlet 73, and an audio equipment operation panel attaching opening 74.

This instrument panel is a multi-layer molding product 8 shown in FIG. 4, the structure of which will be described below. The entire instrument panel comprises a base layer 81 made of a relatively hard polypropylene resin. In the front portion of the instrument panel, there is provided a second layer 82, which is arranged on the base layer 81, made of a relatively soft olefin thermoplastic elastomer.

Next, referring to FIGS. 1 to 4, the molding method of the above multi-layer molding product 8 will be explained.

In this embodiment, the multi-layer molding product 8 is produced as follows. That is, a forming mold including the first and the second mold is used. Between the first and the second molds, cavities are formed two-stepwise, and the second layer 82 is locally molded on the base layer 81 by the method of multi-layer molding.

Figure 1:
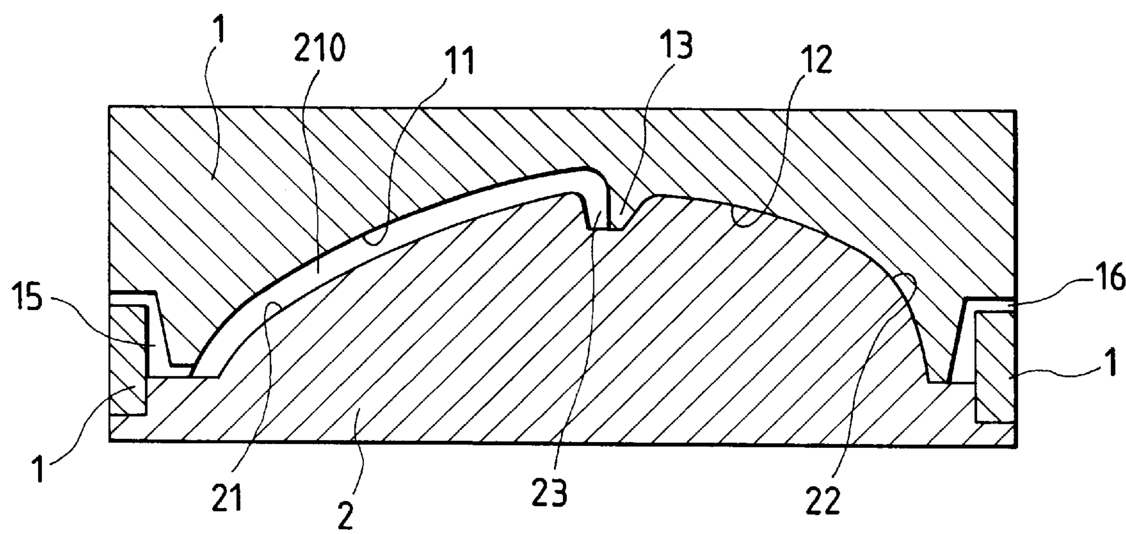
FIG. 1 is a schematic illustration of a forming mold having first and second molds according to a first embodiment.
Figure 2:
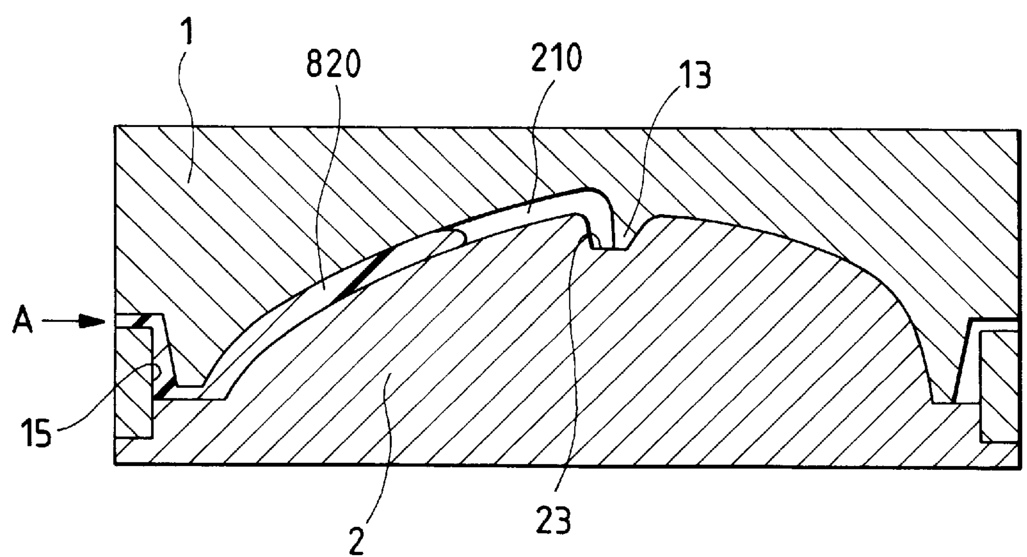
FIG. 2 is a schematic illustration of the forming mold in the case of injecting the second resin according to the first embodiment.

In the production described above, first, as shown in FIG. 1, the cavity 210 for forming the second layer is locally formed between the first mold 1 and the second mold 2. Then, as shown in FIG. 2, the second resin 820 is injected into the cavity 210 for molding the second layer from the gate 15 in a direction of an arrow A, so that the second layer can be molded.

Figure 3:
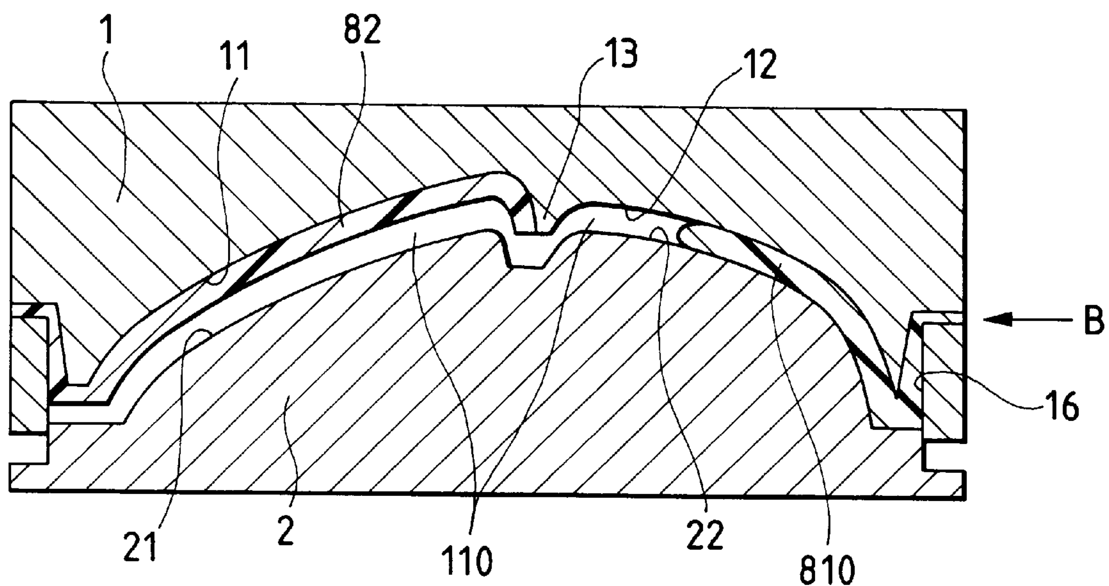
FIG. 3 is a schematic illustration of the forming mold in the case of injecting the resin for the second layer according to the first embodiment.

Next, as shown in FIG. 3, the first mold 1 and the second mold 2 are relatively separated from each other, and the cavity 110 for molding the base layer is formed between the mold surface 12 on the right of the first mold and the mold surface 22 on the right of the second mold and also between the second layer 82 and the mold surface 21 of the second mold 2 which is opposed to the second layer 82.

Next, as shown in FIG. 3, the resin 810 for the base layer is injected from the gate 16 into the cavity 110 for the base layer in a direction of an arrow B. Due to the foregoing, as shown in FIG. 4, the multi-layer molding product 8 can be obtained in which the second layer 82 is locally molded and integrally fused with the base layer 81.

Figure 4:
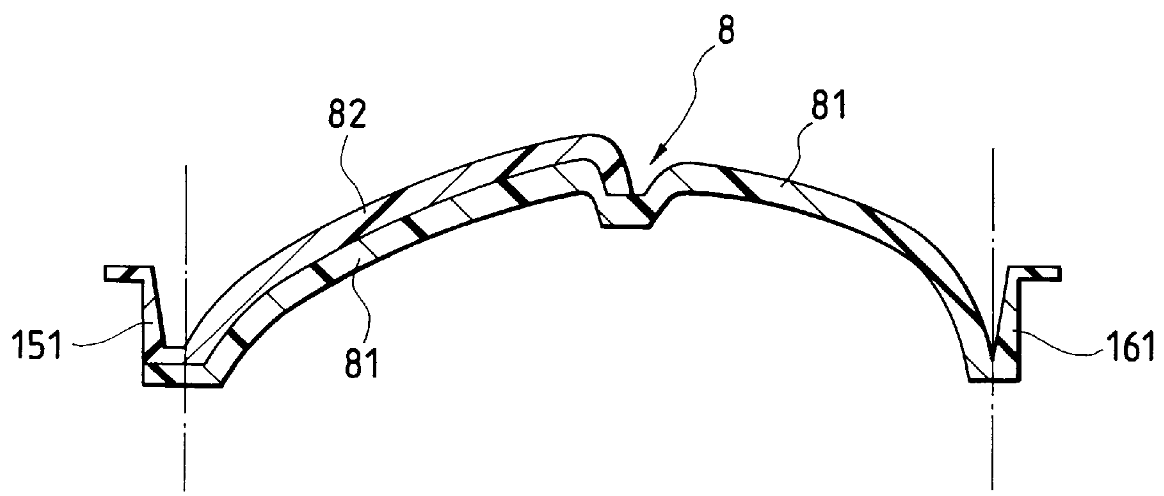
FIG. 4 is a schematic illustration of the multi-layer molding product obtained according to the first embodiment.

In this connection, as shown in FIG. 4, the multi-layer molding product 8 obtained in the above molding is provided with the gate products 151, 161 molded by the gates 15, 16. Therefore, these gate products 151, 161 are cut off. In FIG. 1, reference numeral 13 is a protrusion for division.

In this example, the resin 810 for molding the base layer is injected from the right gate 16 as shown in FIG. 3, however, it is also possible to inject the resin 810 for molding the base layer from the left gate 15.

Next, the operational effect of this embodiment will be explained.

In this embodiment, the cavity 110 for molding the base layer 81 is formed when the first mold 1 and the second mold 2 are used and separated from each other as shown in FIG. 3.

In order to form the cavity 110 for molding the base layer 81, the first mold 1 and the second mold 2 may be relatively moved in the opposite direction by a distance necessary for forming the cavity 110 for the base layer, for example, the first mold 1 and the second mold 2 may be relatively moved by 1 to 5 mm. Therefore, it is unnecessary to provide a drive unit for turning the molds.

In this embodiment, the molds can be relatively moved for the formation of the cavity for molding the base layer by the drive unit which is used when the multi-layer molding product is finally picked up by opening the first and the second mold and also used when the molds are fastened to each other.

2nd Embodiment

Figure 6:
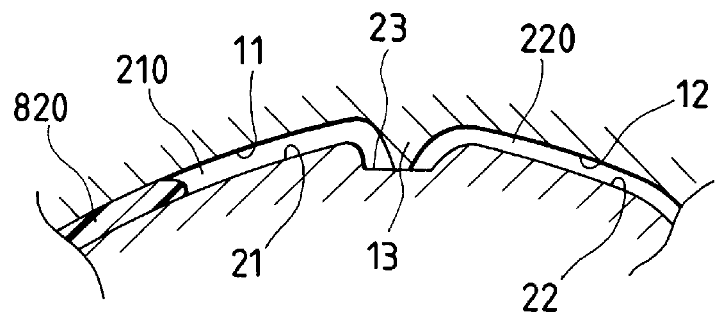
FIG. 6 is a schematic illustration of the forming mold in the case of injecting the second resin according to a second embodiment.
Figure 7:
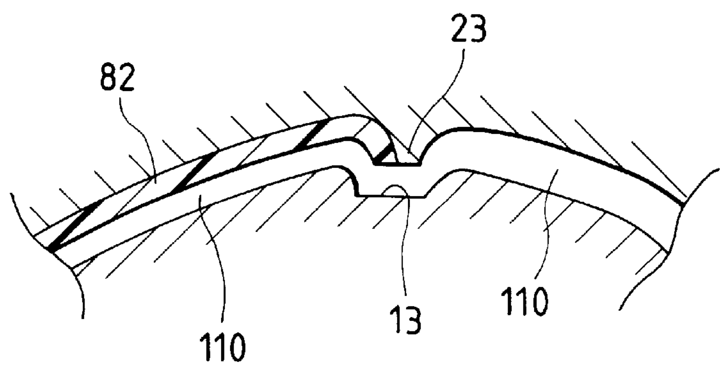
FIG. 7 is a schematic illustration of the forming mold in the condition that the cavity for molding the base layer is formed according to a second embodiment.

A second embodiment of the invention is constituted as follows. As shown in FIGS. 6 and 7, when the second layer 82 is molded in the first embodiment,.there is formed a space 220 in which no second layer is molded, between the right mold surface 12 of the first mold 1 and the right mold surface 22 of the second mold 2.

In this case, the protrusion 13 for division arranged in the first mold closely comes into contact with the recess 23 for division arranged in the second mold.

Due to the foregoing, as shown in FIG. 7, when the second layer 82 is molded in the cavity 210 for molding the second layer formed between the mold surfaces 11 and 21, the second resin 820 does not flow out into the space 220 in which no second layer is molded.

Figure 8:
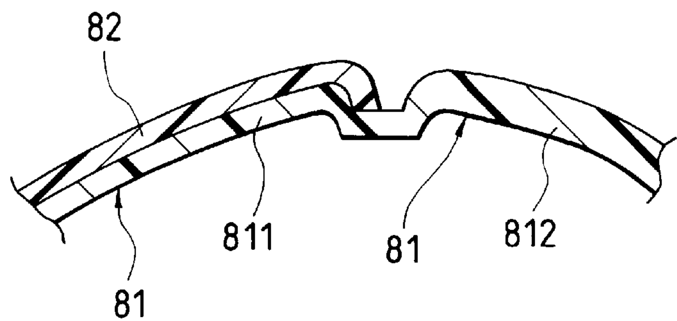
FIG. 8 is a schematic illustration of the multi-layer molding product obtained according to the second embodiment.

In this embodiment, the right portion 812 of the base layer 81 is thicker than the left portion 811 of the base layer 81 as shown in FIG. 8. The reason is that the right portion 812 of the base layer 81 is formed thicker by the thickness of the space 220 in which no second layer is molded.

Other points of this embodiment are the same as those of the first embodiment, and the same operational effect can be provided.

3rd Embodiment

Next is related to a third embodiment of the invention.

Figure 9:
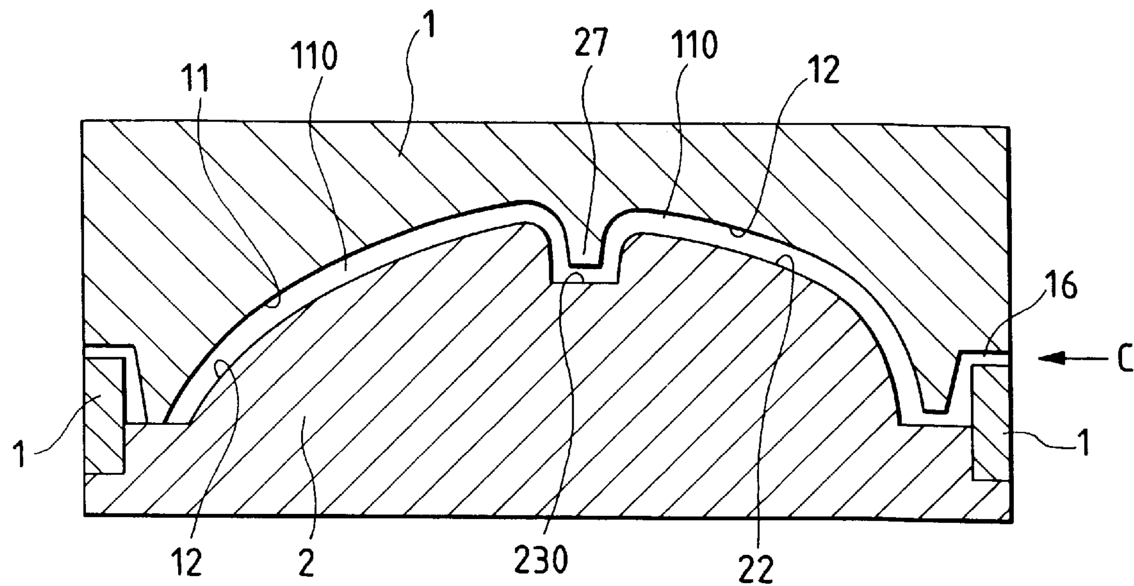
FIG. 9 is a schematic illustration of the forming mold having first and the second molds according to a third embodiment.
Figure 10:
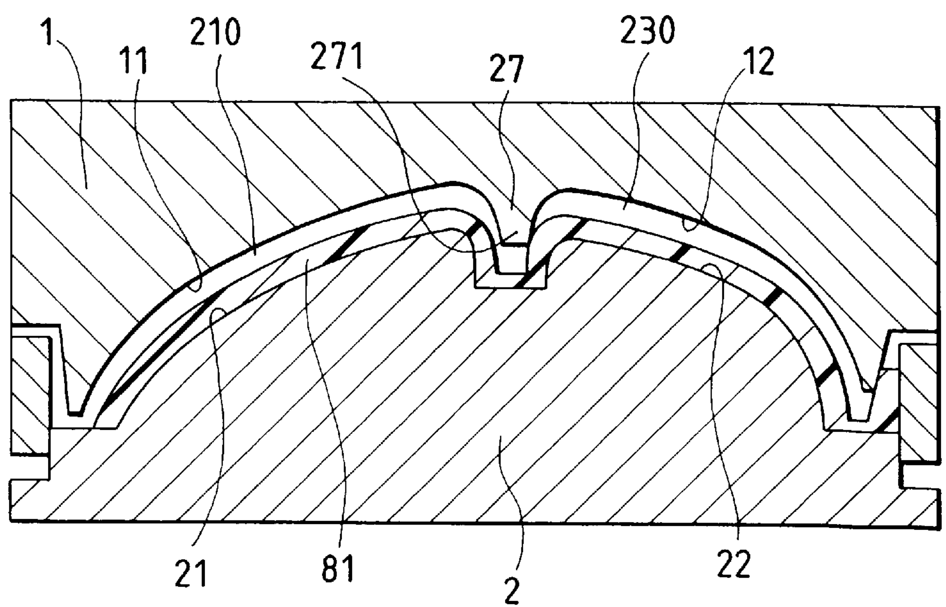
FIG. 10 is a schematic illustration of the forming mold in the condition that the cavity for molding the second layer is formed after the base layer has been molded in the third embodiment.

As shown in FIGS. 9 to 12, this embodiment is different from the first embodiment. First, the base layer 81 is molded, and then the second layer 82 is molded on the base layer 81. At this time, the protrusion 27 for division is made to come into contact with a portion of the base layer 81 as shown in FIG. 10.

Figure 12:
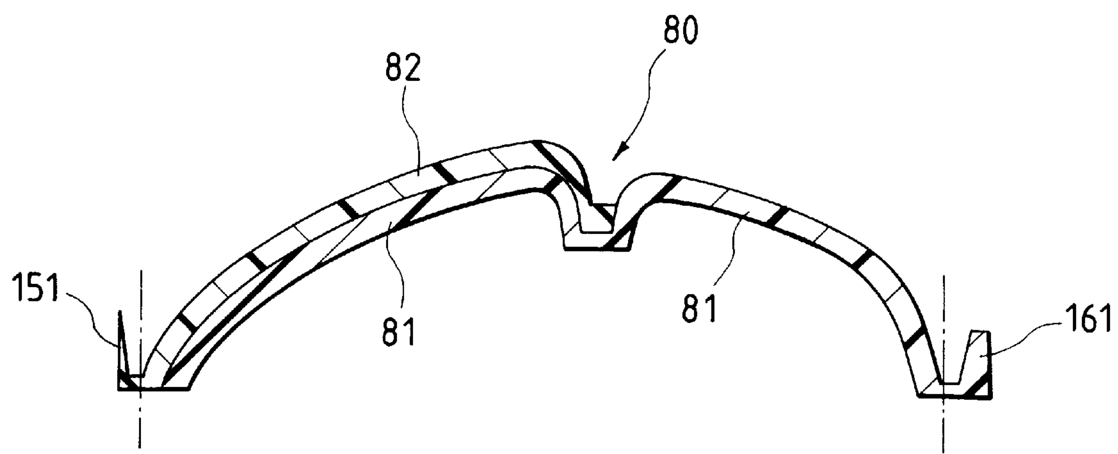
FIG. 12 is a schematic illustration of the multi-layer molding product obtained in the third embodiment.
Figure 13:
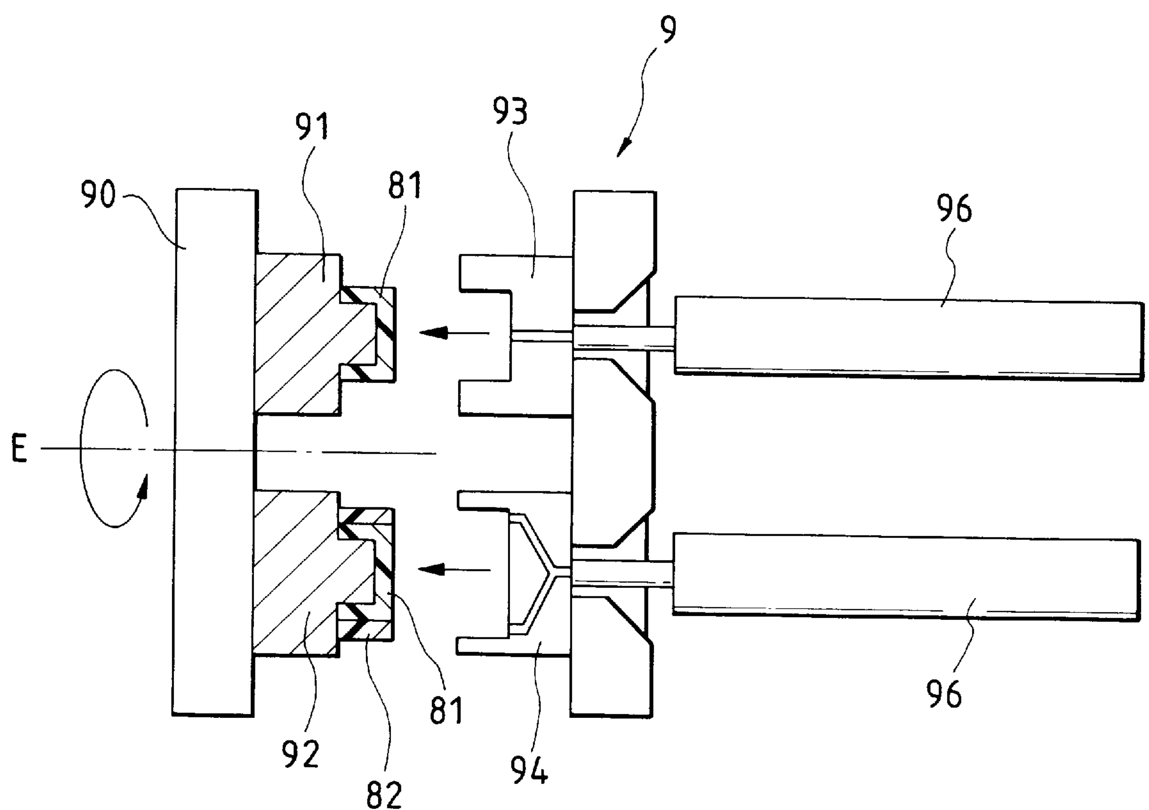
FIG. 13 is a schematic illustration of the mold in the conventional example.

That is, this embodiment provides a method of producing the multi-layer molding product 8 shown in FIG. 12 in which the second layer 82 is locally molded on the base layer 81 by the multi-layer molding method in the same manner as that of the first embodiment.

In this embodiment, on the mold surface 11 of the first mold 1, there are provided a cavity 210 for molding the second layer shown in FIG. 10 and a protrusion 27 for dividing the space 230 in which no second layer is molded.

As shown in FIG. 9, when molding is conducted, the cavity 110 for molding the base layer is continuously formed between the first mold 1 and the second mold 2, and the resin for molding the base layer is injected into the cavity 110 for molding the base layer in a direction of an arrow C, so that the base layer 81 can be molded as shown in FIG. 10.

Next, as shown in FIG. 10, the first mold 1 and the second mold 2 are relatively separated from each other, and the side of the recess 815 of the base layer 81 is made to come into contact with the side of the protrusion 27 for division so that the second resin 820 can not flow out into the space 230 in which no layer is molded. Due to the foregoing, the cavity 210 for molding the second layer is locally formed in a space enclosed with the base layer 81, the mold surface 11 opposed to the base layer 81, and the protrusion 27 for division. In this connection, the recess 815 is formed by the protrusion 27 for division as shown in FIG. 11.

Figure 11:
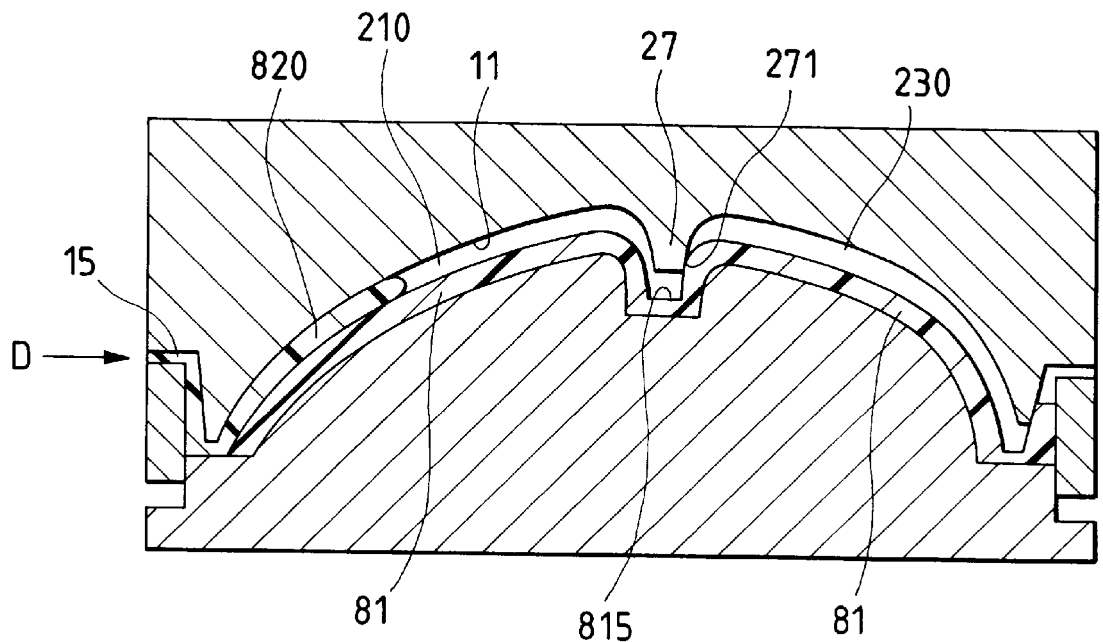
FIG. 11 is a schematic illustration of the forming mold in the case of molding the second layer on the base layer in the third embodiment.

Next, as shown in FIG. 11, the second resin 820 is injected into the cavity 210 for molding the second layer in a direction of an arrow D, so that the multi-layer molding product 80 can be obtained in which the second layer 82 is locally molded on the base layer 81.

Then, the operational effect of the present invention will be explained.

In the present invention, first, the base layer 81 is molded in the cavity 110 for molding the base layer as shown in FIG. 9, and then the second layer 82 is molded in the cavity 210 for molding the second layer which is formed when the base layer 81 is made to come into contact with the protrusion 27 for division. Due to the foregoing, the second layer 82 is locally molded in a portion on the base layer 81. Therefore, the multi-layer molding product 80 can be obtained in which the base layer and the second layer are integrally fused with each other.

The cavity 210 for molding the second layer 81 is formed when the first mold 1 and the second mold 2, which were used for molding the base layer, are moved and separated from each other, and the cavity 210 for molding the second layer 81 is formed by the first mold 1, the second mold 2 and the protrusion 27 for division. Other points are the same as those of the first embodiment.

This embodiment can provide the same effect as that of the first embodiment.

It is possible to provide a multi-layer molding method characterized in that: the mold apparatus is compact, the productivity is high and the equipment cost is low.

What is claimed is:

1. A method of molding a multi-layer molded product using a first mold having a first cavity surface, a second cavity surface and a protrusion extending from between the first cavity surface and the second cavity surface, and the method using a second mold having a first cavity surface, a second cavity surface and a recess defined therebetween, the method comprising:

forming a first cavity between the first mold and the second mold, the first cavity defined by the first cavity surface of the first mold, the first cavity surface of the second mold, and a first portion of the recess of the second mold, wherein a tip end of the protrusion substantially contacts a second portion of the recess;

injecting a first resin into the first cavity to form a first layer, the first layer having an opposing surface opposite the first surface of the second mold;

separating the first mold and the second mold;

forming a second cavity defined by the first cavity surface of the second mold, the recess, the second cavity surface of the first mold, the second cavity surface of the second mold, the protrusion and the opposing surface of the first layer; and injecting a second resin into the second cavity to form a second layer of the multi-layer molded product and a groove defined by a portion of the first layer and a portion of the second layer.

2. The method of claim 1, wherein the first layer has a first end, the groove in the multi-layer molded product being defined by the first end of the first layer and the portion of the second layer.

3. The method of claim 1, wherein during the separating step the first mold and the second mold are separated by approximately 1 to 5 mm.

4. The method of claim 1, further comprising the additional step of:

forming a third cavity spaced from the first cavity when forming the first cavity, the third cavity being defined by the second cavity surface of the first mold, the second cavity surface of the second mold, the protrusion, and a second portion of the recess.

5. The method of claim 1, wherein the groove in the multi-layered molded product is formed by the protrusion.

6. A method of molding a multi-layer molded product using a first mold having a first cavity surface, a second cavity surface, a protrusion between the first cavity surface and the second cavity surface, and a second mold having a first cavity surface and a second cavity surface separated by a recess, the method comprising:

forming a first cavity defined by the first cavity surface of the first mold, the protrusion, the second cavity surface of the first mold, the first cavity surface of the second mold, the recess and the second cavity surface of the second mold;

injecting a first resin into the first cavity to form a first layer having an opposite surface opposed to the first and second surfaces of the first mold with a groove portion formed by the recess and the protrusion;

separating the first mold and the second mold;

maintaining contact between a side surface of the protrusion and a side surface of the groove portion when separating the first mold and the second mold;

forming a second cavity defined by the protrusion, the groove portion, a portion of the opposing surface of the first layer, and the first cavity surface of the first mold; and injecting a second resin into the second cavity to form a second layer, wherein the multi-layer molded product has a groove defined by a portion of the first layer and a portion of the second layer.

7. The method of claim 6, wherein the first layer has a first end, the groove in the multi-layer molded product being defined by the first end of the first layer and the portion of the second layer.

8. The method of claim 6, wherein during the separation step the first mold and the second mold are separated by approximately 1 to 5 mm.

9. The method of claim 6, wherein the groove in the multi-layered molded product is formed by the protrusion.

* * * * *